United States Patent
Rosemeier et al.

(10) Patent No.: US 12,372,429 B2
(45) Date of Patent: Jul. 29, 2025

(54) MECHANICAL TEST DEVICE AND METHOD FOR TESTING BAR-SHAPED TEST OBJECTS, IN PARTICULAR ROTOR BLADES OF WIND TURBINES

(71) Applicant: Fraunhofer-Gesellschaft zur Förderung der Angewandten Forschung e.V., Munich (DE)

(72) Inventors: Malo Rosemeier, Bremerhaven (DE); Gregor Basters, Bremerhaven (DE)

(73) Assignee: Fraunhofer-Gesellschaft zur Förderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 17/794,931

(22) PCT Filed: Jan. 19, 2021

(86) PCT No.: PCT/EP2021/051081
§ 371 (c)(1),
(2) Date: Jul. 22, 2022

(87) PCT Pub. No.: WO2021/148413
PCT Pub. Date: Jul. 29, 2021

(65) Prior Publication Data
US 2023/0060931 A1    Mar. 2, 2023

(30) Foreign Application Priority Data
Jan. 23, 2020   (DE) .................... 10 2020 200 822.1

(51) Int. Cl.
*G01M 5/00*   (2006.01)
*G01M 7/02*   (2006.01)
*G01M 7/04*   (2006.01)

(52) U.S. Cl.
CPC ........ *G01M 5/0016* (2013.01); *G01M 5/0058* (2013.01); *G01M 5/0066* (2013.01); *G01M 7/027* (2013.01); *G01M 7/04* (2013.01)

(58) Field of Classification Search
CPC ...... G01M 7/027; G01M 7/04; G01M 5/0016; G01M 5/0058; G01M 5/0066; Y02E 10/72
See application file for complete search history.

(56) References Cited

U.S. PATENT DOCUMENTS

2019/0094104 A1    3/2019   Penn
2020/0003654 A1*   1/2020   Huot ...................... G01M 7/08

FOREIGN PATENT DOCUMENTS

CN    204594684 U    8/2015
DE    102008048131 A1   4/2010

OTHER PUBLICATIONS

International Search Report and Written Opinion issued in PCT/EP2021/051081, mailed Apr. 16, 2021.

* cited by examiner

Primary Examiner — Lisa M Caputo
Assistant Examiner — Cynthia L Davis
(74) Attorney, Agent, or Firm — Nelson Mullins Riley & Scarborough LLP (57) ABSTRACT

The invention relates to a mechanical testing device with at least one load frame, which has a frame part and a clamping device held therein, in which a beam-shaped test specimen, in particular a rotor blade or rotor blade segment, can be clamped projecting through the load frame, the load frame being mounted in a first pivot bearing arrangement on a carrier frame or a support frame so as to be rotatable about a first transverse axis of the test specimen which extends perpendicularly to its longitudinal axis projecting through the clamping device, wherein the frame part has a four-fold (Continued)

rotational symmetry, in particular a square shape, or an annular shape. The design of the load frame(s) results in easy rotatability/adjustability of the test specimen. In a method for carrying out the test, the system natural frequencies in different loading directions can be suitably matched.

8 Claims, 8 Drawing Sheets

MECHANICAL TEST DEVICE AND METHOD FOR TESTING BAR-SHAPED TEST OBJECTS, IN PARTICULAR ROTOR BLADES OF WIND TURBINES

CROSS-REFERENCE TO RELATED APPLICATIONS

This application is a U.S. national stage of PCT/EP2021/051081 filed, on Jan. 19, 2021, the entire disclosure of which is expressly incorporated herein by reference.

BACKGROUND OF THE INVENTION

The invention is in the field of mechanics and mechanical engineering and can be used in the testing of wind turbine rotors.

Specifically, the invention relates to a testing device and a method for testing beam-shaped test specimens, for example rotor blades or rotor blade sections of wind turbines.

Such rotor blades are exposed to strong and long-lasting loads during operation. The aim is to achieve the longest possible service life for wind turbines, while ensuring that breakage due to material fatigue can be ruled out as reliably as possible.

In order to be able to predict the service life of rotors or optimize it through design measures, mechanical load tests are necessary that allow rotor blades to be subjected to cyclic loading under reproducible conditions that can be defined as precisely as possible.

For this purpose, testing devices are used that can be operated automatically over a longer period of time.

Such testing devices must allow rotor blades to be mounted or supported, or also clamped, and must also offer the possibility of cyclic mechanical load application in one or more directions by active load-introducing means. In addition, passive load-introducing means can be provided, which can be used, for example, to adjust system natural frequencies.

Different test cases require a force application in such a way that the test specimen retains certain degrees of freedom.

The European patent application EP3433594 A1 describes a test fixture in which a test specimen is clamped in load frames, each of which can rotate/pivot about an axis. However, with the known system, even a rotation of the entire test specimen around its longitudinal axis in order to be able to load in both the flapping and rotational directions of a rotor blade is highly complex and requires major modifications.

SUMMARY OF THE INVENTION

Against the background of the state of the art, the present invention is based on the object of creating a testing device and a test method which allow for the setting of different test conditions to the greatest possible extent and in the simplest possible manner.

The object is solved according to the invention with the features of claim 1 by a testing device. The dependent claims dependent on claim 1 present possible implementations of testing devices.

Accordingly, the invention relates to a mechanical testing device having at least one load frame which has a frame part and a clamping device held therein, in which a beam-shaped test specimen, for example a rotor blade or rotor blade segment, can be clamped projecting through the load frame, the load frame being mounted in a first pivot bearing arrangement on a carrier frame or a support frame so as to be rotatable about a first transverse axis of the test specimen, which runs perpendicular to its longitudinal axis projecting through the clamping device, the frame part having a fourfold rotational symmetry, for example a square shape, or a annular shape.

The symmetry of the load frame makes it easy to rotate the test specimen as a whole about its longitudinal axis by 90 degrees in each case or also, in the case of an annular shape of the frame part, by other angular amounts. This allows loads, especially cyclic loads, to be applied to a test specimen from different directions with the aid of active load-introducing means. For example, with minimal modifications, a load test with a load in the rotational direction of a rotor blade and then a load test with a load in the flapping direction is possible, using the same active load-introducing means. Rotations of the test specimen by angular amounts other than 90 degrees are also possible in principle. Such rotatability is basically provided by the fact that the frame part can be rotated as a whole and can be rotatably mounted in a carrier frame or a support frame in various angular positions, for example offset from one another by 90 degrees in each case.

Furthermore, the invention also relates to a testing device in which the clamping device can be fastened in the frame part in several positions, for example by means of a tensioning device, which are each rotated relative to one another about the longitudinal axis of the clamped test specimen, for example rotated 90 degrees.

Thus, as an alternative or in addition to the mountability of the load frame in several angular positions, the clamping device within the frame part of the load frame can also be rotated and fixed about the longitudinal axis of the test specimen by 90 degrees in each case or, in the case of a circular frame part, by other angular amounts. To fix the clamping device in the frame part, a tensioning device is provided on the frame part, which enables the clamping device to be clamped in the frame part. The clamping device may in turn comprise several clamping blocks between which a test specimen can be clamped, for example in the course of clamping the clamping device by the frame part. The tensioning device can be designed as a clamp or also as a screw connection between the frame parts.

If the test specimen is tested again after a 90 degree rotation, the existing active and passive load-introducing elements can continue to be used at least partially for the new test, including for example if load introduction elements are provided for load introduction in at least 2 directions perpendicular to each other.

The invention further relates to a testing device in which the frame part has at least two frame-part-side pivot bearing parts or fastening devices for pivot bearing parts, which are arranged offset by 90 degrees on its circumference and are each set up to interact with carrier-frame-side pivot bearing parts on a carrier frame or pivot bearing parts on a support frame.

It may also be provided that the frame part has an annular shape and has a plurality of frame member-side pivot bearing members or fastening devices for frame-part-side pivot bearing parts arranged offset on its circumference, each of which is adapted to interact with carrier frame-side pivot bearing members on a carrier frame or pivot bearing members on a support frame.

Thus, for example, pivots or pivot holes can be provided, fastened or attachable to the circular frame part as pivot bearing parts in several positions on the circumference, or fastening devices for pivots or pivot holes can be provided in order to be able to rotate the frame part about the longitudinal axis of the test specimen into one of several angular positions and to rotatably support it in such a position without major conversion effort.

It can also be provided that two clamping blocks are provided within the clamping device, which between them leave a through-opening for the test specimen, the width of which, measured perpendicular to the longitudinal axis of a clamped test specimen, is at least twice, or for example at least three or five times as large as its height, whereby in the case of a test specimen in the form of a rotor blade segment, the width of the through-opening is measured in the rotational direction and the height in the flapping direction.

The shape of the clamping blocks described in this way takes account of the shape of a wind turbine rotor blade. The extent of such a rotor blade in the rotational direction, which here corresponds to the width of the through-opening, is usually several times greater than the extent of a rotor blade in the flapping direction at the same point with respect to the longitudinal axis of the rotor blade. Nevertheless, the clamping blocks of the clamping device, which are joined together to form a unit, may have a circular or square outer contour when viewed in the direction of the longitudinal axis of the clamped test specimen, in accordance with the invention.

A further implementation may provide that the frame part is rotatably mounted in a first pivot bearing arrangement in a carrier frame about the first transverse axis, wherein the carrier frame has the same rotational symmetry as the frame part and the carrier frame is rotatably mounted in a second pivot bearing arrangement on a support frame about a second transverse axis of the test specimen clamped in the load frame, which axis is perpendicular to the longitudinal axis and, in some embodiments, inclined with respect to the first transverse axis, further, in some embodiments, perpendicular to the first transverse axis of the test specimen.

Such an arrangement enables biaxial tests, which require the test specimen to be rotatable about several axes at a bearing point, for example at a load frame.

It can also be provided that the support frame is mounted so that it can pivot about a pivot axis perpendicular to the longitudinal axis of the test specimen and at a distance from it.

The described pivotability of the support frame allows the test specimen to be moved with the load frame in the direction of the longitudinal axis of the test specimen. This is a degree of freedom that may be useful or necessary for both uniaxial tests and biaxial tests.

Another implementation may provide that the frame part in the first pivot bearing arrangement is mounted in a support frame for rotation about the first transverse axis, and the support frame is mounted for pivoting about a pivot axis perpendicular to and spaced from the longitudinal axis of the test specimen.

This allows the test specimen to be moved with the load frame in the direction of the longitudinal axis of the test specimen in the event that the load frame is mounted directly in a support frame, for example for uniaxial tests.

25 In addition, the invention may also relate to the fact that at least one active or passive load-introducing means is provided within a testing device, which has a load frame for connection to a test specimen or engages on such a load frame, wherein the load frame, as already described in detail above, has a frame part and a clamping device held therein, in which a beam-shaped test specimen, for example a rotor blade or rotor blade segment, can be clamped projecting through the load frame, and wherein the frame part has a four-fold rotational symmetry, for example a square shape, or an annular shape.

This allows for rotatability of the load frames about the longitudinal axis of the test specimen for any or all load frames used to couple the test specimen to active or passive load-introducing means.

In principle, it should be added to the above descriptions that the testing device can in all cases have a device for the one-sided mounting or clamping of a test specimen, for example a rotor blade.

In addition to a testing device of the type mentioned above, the invention also relates to a method for carrying out a uniaxial or biaxial test of a test specimen in the form of a rotor blade or rotor blade segment of a wind turbine using a testing device, including but not exclusively a testing device of the type described above, in which clamping blocks are first rotated within the frame part of a load frame into the desired position within the frame part as a function of the axis of the test specimen to be tested, and are then clamped firmly to the test specimen, and in that a load is then introduced into the test specimen in accordance with a predetermined test scheme.

In this way, the test specimen can be rotated to the desired angular position about its longitudinal axis for a desired test in many cases without rotating the frame part of the support frame. However, a combination of rotation of the clamping blocks within the support frame and the support frame itself about the longitudinal axis may also be provided.

The invention further relates to a method for performing a biaxial test of a test specimen in the form of a rotor blade or rotor blade segment of a wind turbine using a testing device, including but not exclusively a test device of the type described above, in which two loading directions are first defined by rotating clamping blocks within a load frame and/or by rotating the load frame in a carrier frame, and then, by adjusting one or more passive load-introducing elements, at least one of which acts only in one of the loading directions or parallel to one of the loading directions, the suitable load frequencies in the two loading directions are set in a desired ratio to one another in such a way that one of the two suitable loading frequencies is an integral multiple of the other suitable loading frequency, the suitable load frequencies in each case being for example system natural frequencies of the test specimen for an oscillation in the respective loading direction.

Due to the rotatability of the test specimen around its longitudinal axis, loading directions as well as the effective directions of the passive load-introducing means can be freely adjusted. For example, a rotor blade can be easily tested not only under load in the flapping direction and the rotational direction, but also in the directions in between.

BRIEF DESCRIPTION OF THE DRAWINGS

The invention is shown below using exemplary embodiments in figures of a drawing and then described.

DETAILED DESCRIPTION

Figure 1:
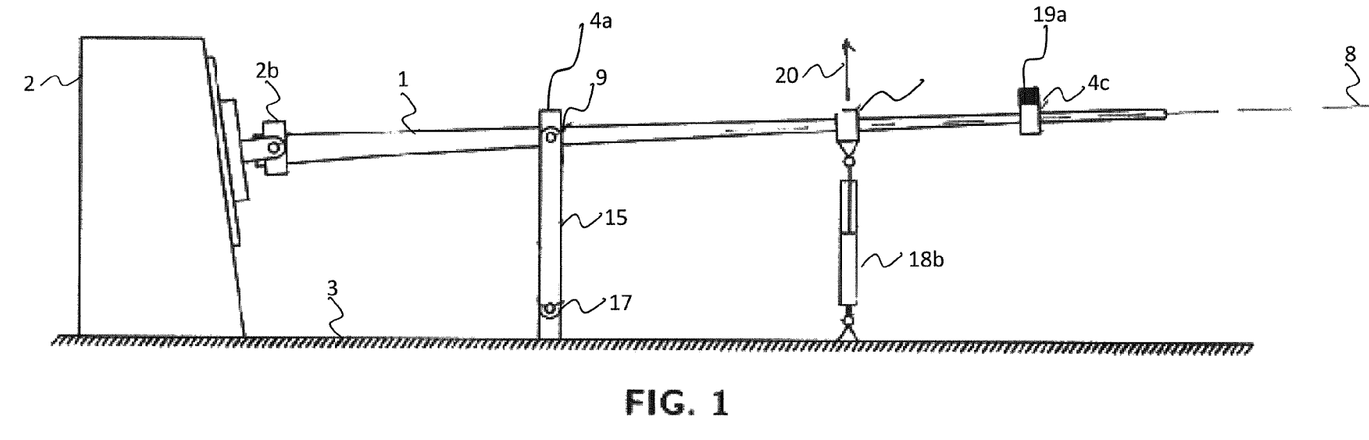
FIG. 1 and FIG. 2 each show a side view of a testing device with a test specimen mounted on one side.

FIG. 1 shows a side view of a test specimen 1 in the form of a rotor blade of a wind turbine, which is pivotably mounted on one side on a holding device 2 in a bearing device 2b. Within the bearing device 2b, the test specimen may be clamped in a load frame according to the invention.

The test specimen 1 is also mounted by means of a load frame 4a on a support frame 15 so that it can rotate about a transverse axis 9. The support frame is in turn mounted on the foundation side so that it can rotate about a pivot axis 17. Axes 9, 17 are perpendicular to the drawing plane.

The test specimen is supported against the foundation 3 by means of the support frame 15.

The test specimen 1 is clamped in another load frame 4b, and an active load-introducing means 18b engages the load frame 4b. By means of the active load-introducing means 18b, which can for example be designed as an electromagnetically, hydraulically or pneumatically driven actuator, a load can be applied to the test specimen in the direction of the arrow 20. During a load test, this load can be changed cyclically so that it acts periodically in the form of a sinusoidal or sawtooth or rectangular load, for example.

A load frame 4c is additionally arranged on the test specimen 1, by means of which a passive load-introducing means 19a is coupled in the form of a mass fastened to the test specimen. The size of the mass and its position along the longitudinal axis 8 of the test specimen can be used to suitably adjust the system natural frequency of the test specimen when vibrating in the direction of arrow 20.

The load frames 4a, 4b, 4c and load frames inserted on the frame of the bearing 2b can each be designed individually or in groups or all together as load frames according to the invention with a four-fold symmetry, for example as square or circular load frames.

This allows the test specimen 1 to be rotated 90 degrees about its longitudinal axis 8 in a simple manner, for example, and tested thereon using the same load-introducing means 18b. In this way, at least several independent uniaxial tests can be performed with little effort.

Figure 2:
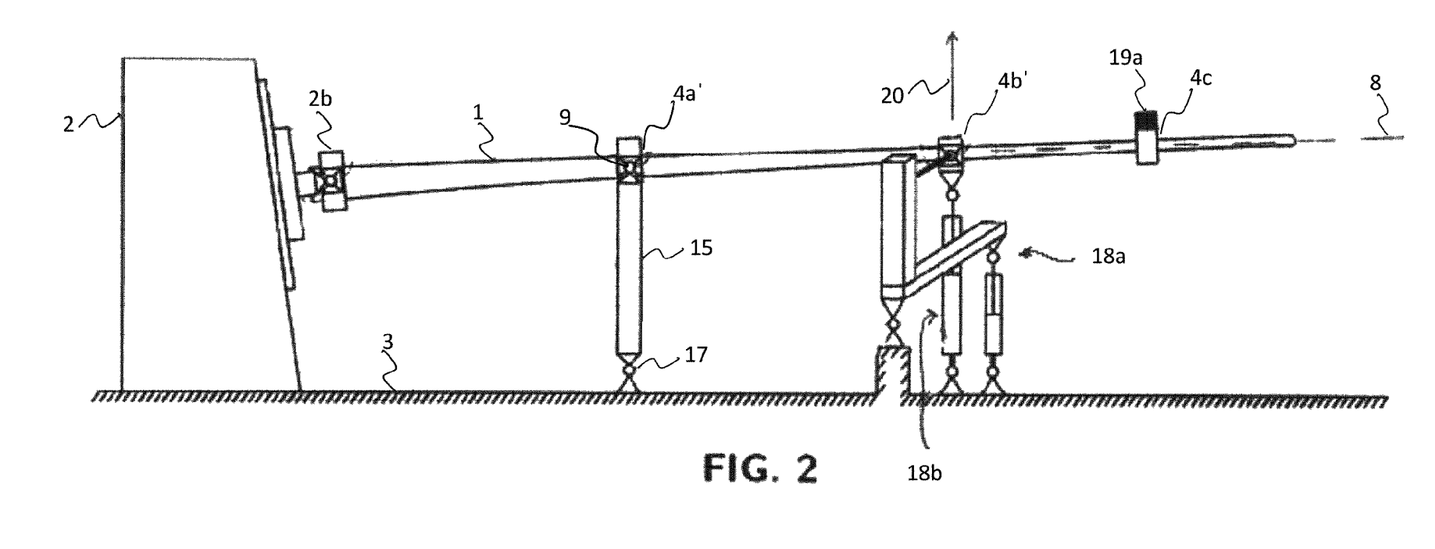

FIG. 2 shows a testing device similar to the test device shown in FIG. 1, but the active load-introducing means 18a, 18b are configured such that each of them acts in a different loading direction. A first active load-introducing means 18a is provided, by means of which a variable load on the test specimen 1 can be generated in the direction perpendicular to the drawing plane. In addition, a second active load-introducing means 18b is shown, by means of which a load can be applied to the test specimen in the direction of the arrow 20, that is, in the drawing plane.

As in the variant shown in FIG. 1, the test specimen 1 is pivotably mounted on a holding device 2 by means of a bearing device 2b and held in a support frame 15 by means of a load frame 4a'. Similar applications are also conceivable in which the test specimen is clamped at one end in the holding device.

The active load-introducing means 18a, 18b can also engage the test specimen by means of a load frame 4b'. The load frames 4a', 4b' are each mounted rotatably about a first transverse axis in a carrier frame, which in turn is mounted rotatably about a second transverse axis. Each of the load frames 4a' 4b' can be designed with four-fold rotational symmetry, square or circular. In this way, the test specimen 1 can be rotated about several axes when transverse forces are applied, so that biaxial tests can also be carried out without difficulty. The test specimen can be fixed in the respective load frames by means of a clamping device with at least two clamping blocks, whereby the clamping device can also be rotated in the load frame so that the test specimen can be rotated about its longitudinal axis even without a rotation of the frame parts in order to set suitable test conditions. If a circular load frame is used, the clamping device can even be continuously rotatable in the load frame and clamped in an infinite number of angular positions, so that the test specimen 1 can also be continuously rotated about its longitudinal axis 8 and then fixed.

Figure 3:
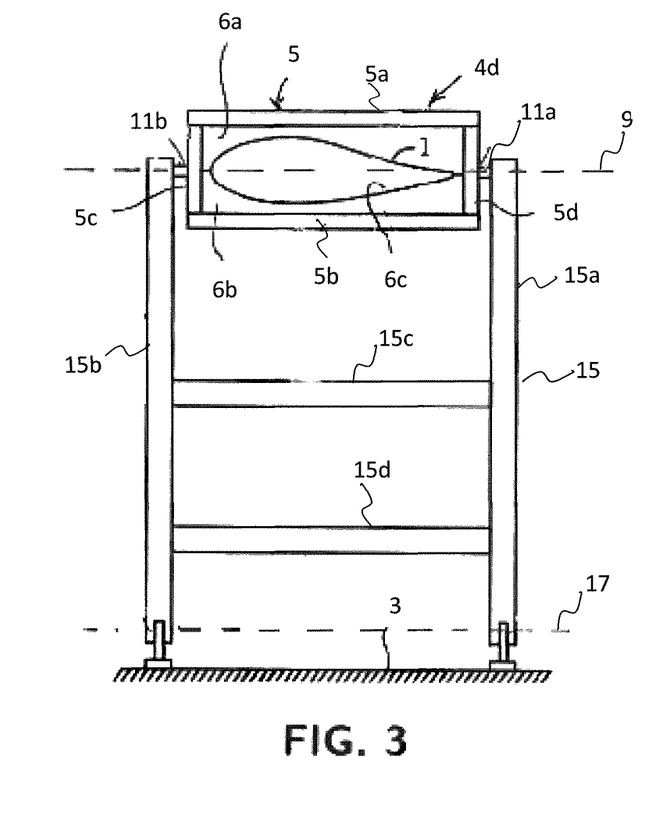
FIG. 3 shows a load frame rotatably mounted on a support frame.

FIG. 3 shows, in a viewing direction along the longitudinal axis 8 of a test specimen, the test specimen 1 in cross-section as well as a view of a support frame 15, which is pivotally attached to a foundation 3 about a pivot axis 17.

The support frame 15 has two longitudinal members 15a, 15b and transverse members 15c, 15d as well as support frame-part-side pivot bearing elements, which complement pivot bearing parts 11a, 11b on the frame part side to form pivot bearings. This allows a load frame 4d to rotate about the first transverse axis 9 relative to the support frame 15.

The load frame 4d is rectangular in shape and has a rectangular frame part 5 with frame part elements 5a, 5b, 5c, 5d. Two clamping blocks 6a, 6b of a clamping device are clamped in the frame part 5. These have a through-opening 6c between them for the test specimen 1. The elements 5a, 5b, 5c, 5d of the frame part 5 can be braced together by fasteners such as screws or clamps to clamp between them the clamping blocks 6a, 6b and the test specimen 1.

Figure 4:
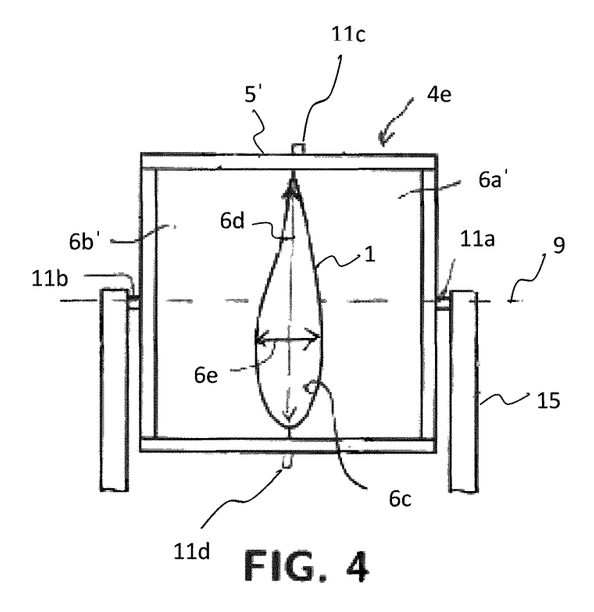
FIG. 4 shows a load frame with four-fold symmetry.

In FIG. 4, a load frame 4e is shown in a view along the longitudinal axis 8 of the test specimen, which has a four-fold symmetry about the longitudinal axis 8 of the test specimen 1. The contour of the load frame 4e is square. In this case, the long sides of the frame part 5 are the same length. The clamping blocks 6a' and 6b' thus form a clamping device which also has a square outer contour and can be rotated in 90° steps relative to the frame part 5. Thus, the test specimen 1 can also be fixed in the frame part 5 in positions rotated 90° with respect to each other.

In FIG. 4, the load frame is rotatable about a first transverse axis 9 relative to a support frame 15 by means of pivot bearing parts 11a, 11b.

In addition to the pivot bearing parts 11a, 11b shown symbolically in the form of a pin, the frame part 5' also has pivot bearing parts 11c, 11d, each offset by 90°, so that the load frame can also be rotated and supported by 90° relative to the support frame.

Figure 5:
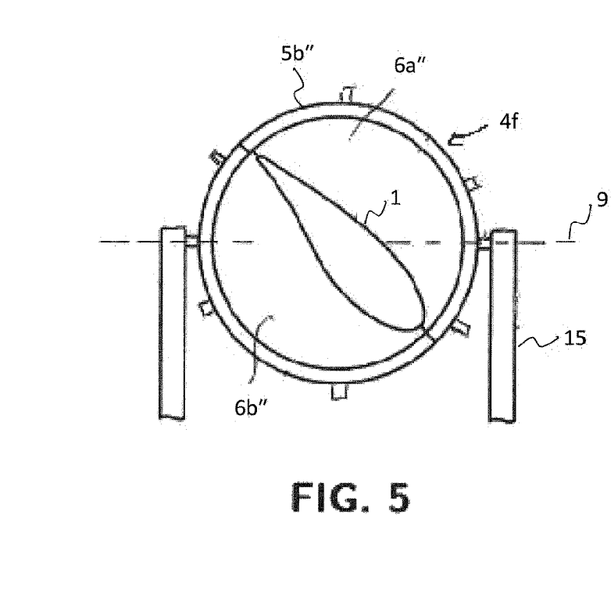
FIG. 5 shows a circular, ring-shaped load frame.

FIG. 5 shows a test specimen 1 clamped between two clamping blocks 6a", 6b" which together form a circular contour. The clamping device 6a", 6b" is clamped as a whole in a circular ring-shaped frame part 5". For this purpose, the frame part 5" is divided into two semicircular ring parts which can be clamped together by means of clamps or screws in order to clamp the circular clamping device between them. The frame part 5" is mounted in a support device 15 so that it can rotate about a first transverse axis 9. Further pivot bearing parts are symbolically shown on the circumference of the frame part 5".

Alternatively, a circular ring-shaped frame can be designed as a large bearing, for example a ball or tapered bearing. In it, the clamping device can be easily twisted together with the test specimen in the clamped state. This allows the test specimen to be additionally supported in a torsion-free manner. If both frames 2b and 4a are designed as large bearings, the large bearing can be locked at one of the frames so that the torsion can be absorbed at least at one frame.

Figure 8:
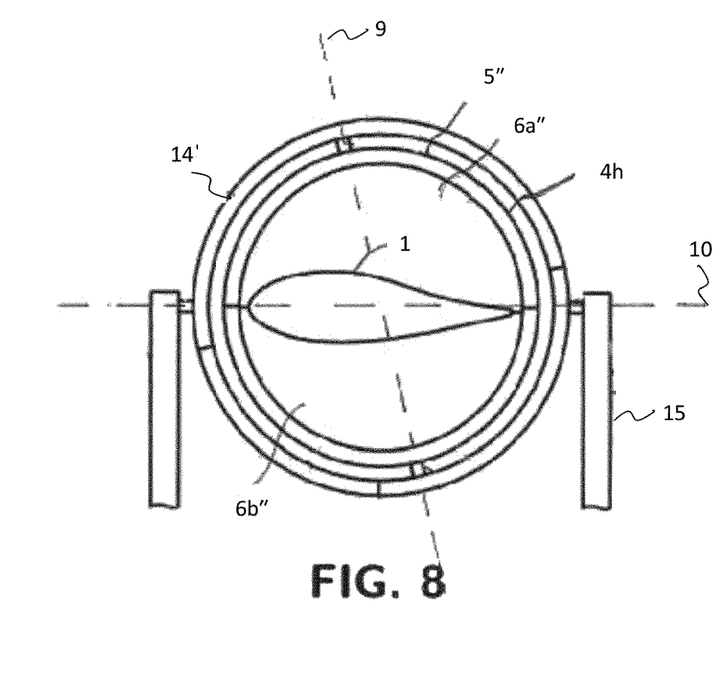
FIG. 8 shows a circular load frame mounted in a likewise circular carrier frame.

The equivalent applies to the frames of the biaxial test in FIG. 8; in these, either the carrier frame or the load frame is designed as a large bearing and optionally locked.

Figure 6:
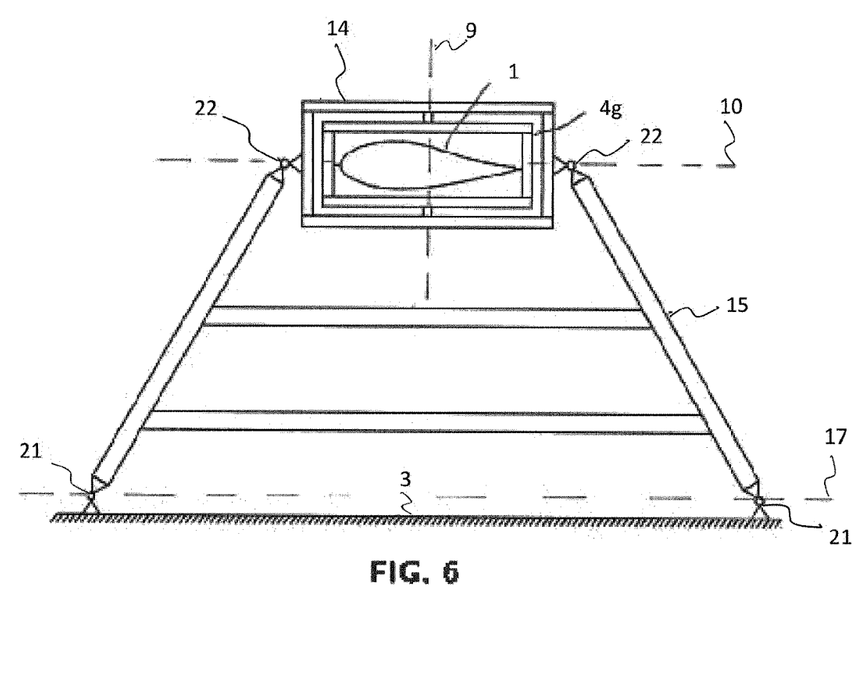
FIG. 6 shows a load frame rotatably mounted in a carrier frame, the support frame being rotatably mounted in a support frame.

FIG. 6 shows a load frame 4g, which is rectangular in shape and has a rectangular clamping device. The rectangular frame part of the load frame 4g is rotatably mounted about a first transverse axis 9 relative to a carrier frame 14. The carrier frame 14 has a correspondingly rectangular shape and is in turn rotatably mounted about a second transverse axis 10 on a support frame 15. Overall, a gimbal suspension of the load frame 4g in the support frame 15 can thus be achieved. The support frame 15 is also mounted on the foundation 3 so that it can pivot about a pivot axis 17. Furthermore, the support frame 15 is angled compared to FIG. 3 so that transverse forces parallel to the pivot axis 17 can also be absorbed at the bearing areas 21. The bearing areas 22 of the axle 10 and the bearing areas 21 are designed as ball joints, for example. The transverse axes 9, 10 are perpendicular to each other in the example shown. Such a vertical arrangement of the pivot axes is not absolutely necessary, for example, in the case of circular frame parts or load frames, as will be shown below with reference to FIG. 8.

Figure 7:
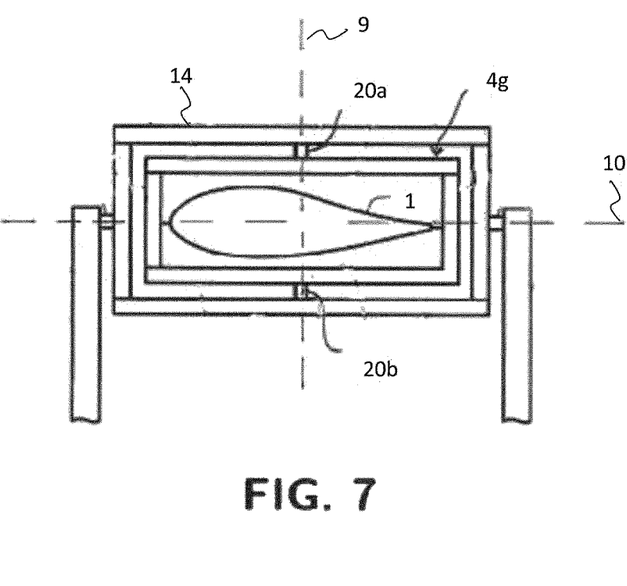
FIG. 7 shows an enlarged version of a load frame and a carrier frame as shown in FIG. 6.

In FIG. 7, the configuration with a rectangular load frame 4g rotatably mounted in a likewise rectangular carrier frame 14 is again shown in detail in enlarged form.

If the load frame 4g is square and the carrier frame 14 also has four-fold symmetry, the load frame 4g can be rotated within the carrier frame 14 in 90° increments. Corresponding pivot bearing parts on the frame part side and frame-part-side pivot bearing parts can be provided on the load frame 4g and/or on the carrier frame 14, so that pivot bearings are formed in each case in the positions rotated by 90° relative to one another about the longitudinal axis of the test specimen.

The carrier frame can also be rotatable relative to the support frame about the longitudinal axis of the test specimen, for example in 90° increments in the case of a square support frame.

FIG. 8 shows a circular ring-shaped load frame 4h, which has a frame part consisting of two semicircular ring segments that are braced against each other and clamp a circular clamping device 6a", 6b". On the one hand, the clamping device 6a", 6b" can be rotated and clamped continuously about the longitudinal axis of the test specimen 1 relative to the frame part of the load frame 4h. On the other hand, the annular frame part may also be rotatably mounted or supportable in various rotational positions relative to the carrier frame 14'. For this purpose, frame-part-side pivot bearing parts can be arranged on the frame part in various positions, each of which can interact with carrier-frame-side pivot bearing parts and form pivot bearings. On the other hand, fastening devices for pivot bearing parts can also simply be provided on the circumference of the frame part of the load frame 4h, for example in the form of bores into which pivot bearing parts can be inserted, in order to position the load frame 4h in various rotational positions with respect to the carrier frame 14' and to support it in a pivot bearing in each case.

The carrier frame 14' is mounted by means of pivot bearings about the second transverse axis 10 relative to a support frame 15. In FIG. 8, it can be seen that the first transverse axis 9, about which the load frame 4h is rotatable, is inclined at an angle other than 90° with respect to the second transverse axis 10, about which the carrier frame 14' is rotatable. However, an angle of 90° can also be provided between the two transverse axes 9, 10.

Also, the carrier frame 14' may have a plurality of pivot bearing parts to be rotatably mountable on the support frame at a plurality of angular positions rotated relative to each other about the longitudinal axis of the test specimen 1.

Figure 9:
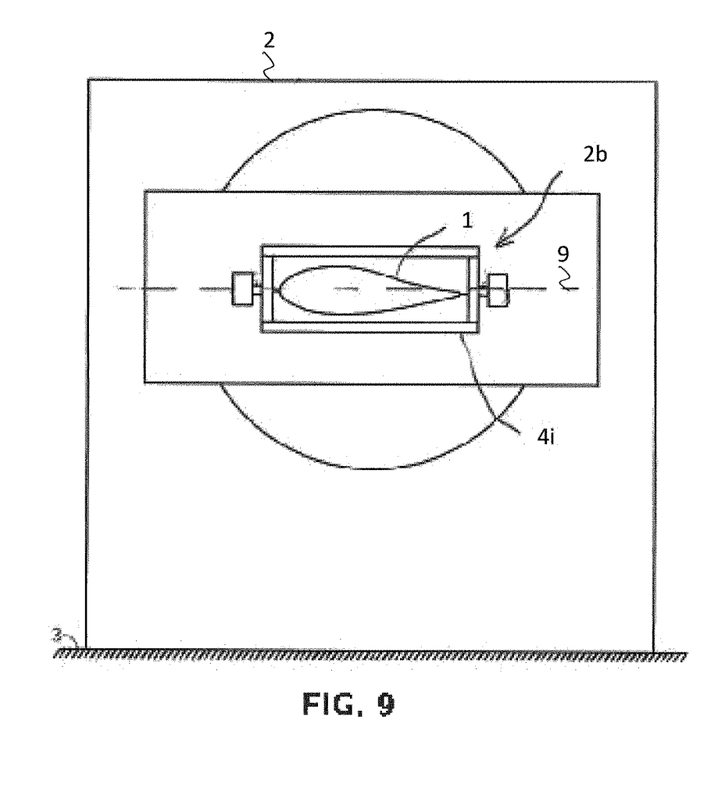
FIG. 9 and FIG. 10 show a load frame rotatable about an axis on a rotatably mounted end of a test specimen, FIGS. 11, 12 each show a load frame rotatable about two axes, in which a test specimen is supported at one of its ends.
Figure 10:
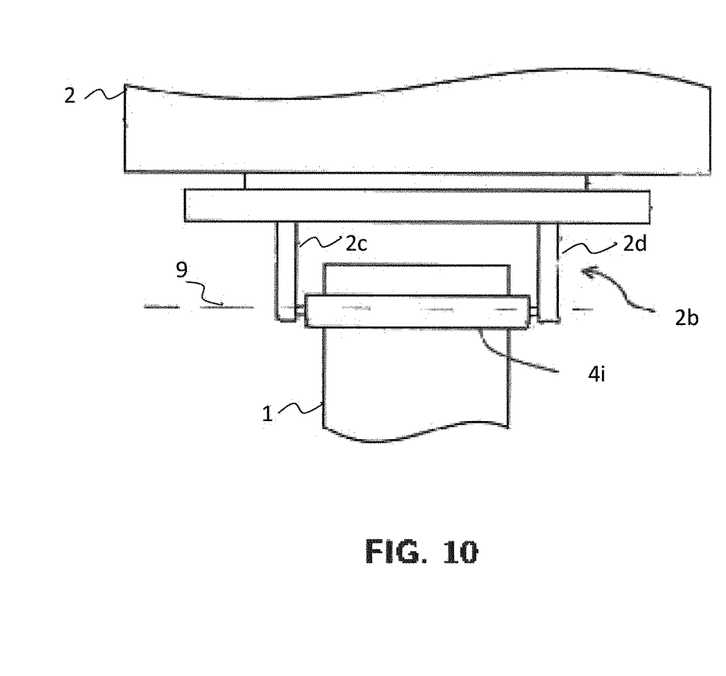

FIG. 9 shows, in a view of the holding device 2 as seen in the longitudinal direction 8 of the test specimen, a load frame 4i in which a test specimen is clamped, the load frame 4i being rotatably mounted about a horizontally arranged first transverse axis 9. The bearing of the load frame 4i provides for pivot bearings arranged on holder arms 2c, 2d of the bearing device 2b. The position of the pivot bearings can be seen in the top view of FIG. 10. If a square load frame according to the invention is selected instead of the rectangular load frame 4i, both the clamping device within the frame part and the frame part itself can be rotated 90° about the longitudinal axis in a simple manner and stored in the storage device 2b, 2c, 2d.

Figure 11:
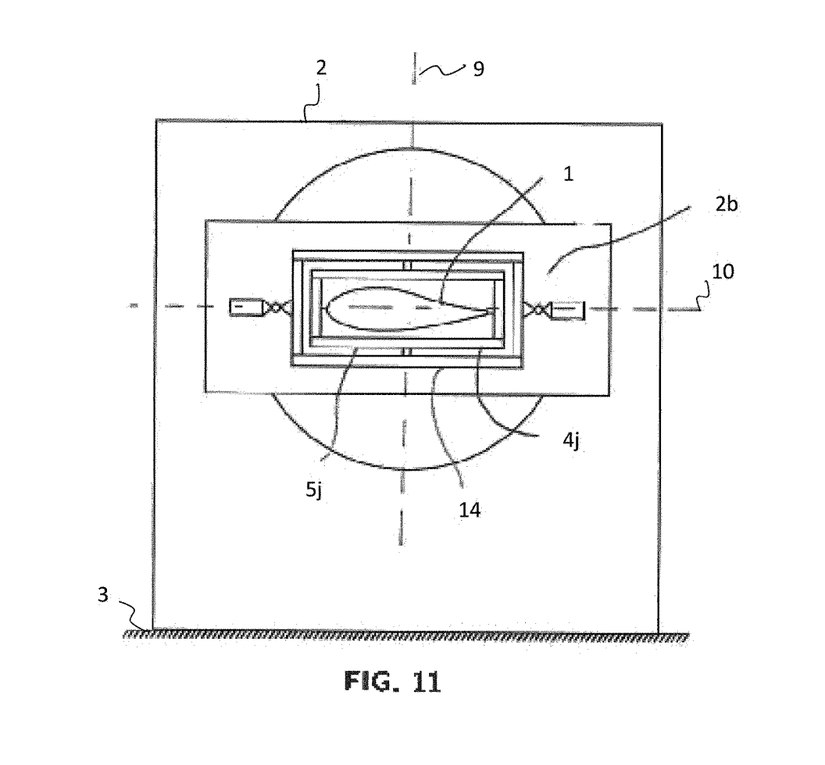
Figure 12:
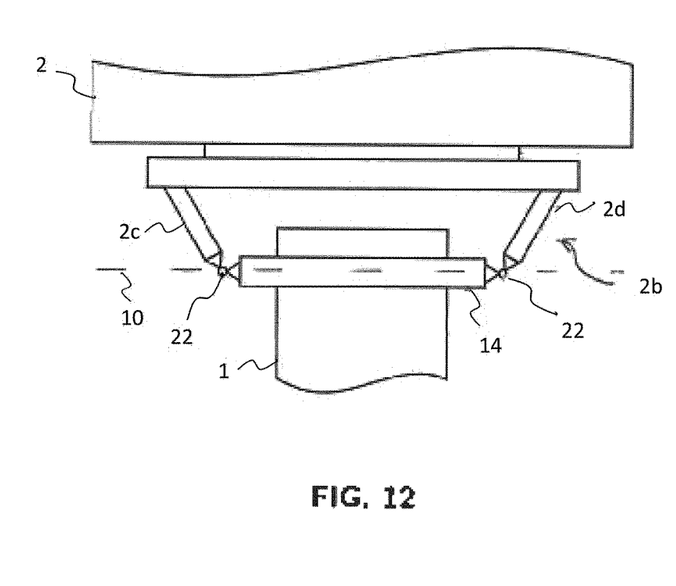

FIG. 11 shows in a plan view analogous to FIG. 9 a load frame 4j, which is rectangular in shape and in which a test specimen 1 is clamped. The load frame 4j has a rectangular frame part 5j that is rotatably mounted about a vertical first transverse axis 9 in pivot bearings within a carrier frame 14. The carrier frame 14 is also rectangular in shape and is rotatably mounted by means of pivot bearings about a horizontal second transverse axis 10 on angled arms 2c, 2d of the bearing device 2b, as can be seen from FIG. 12 in a plan view from above. The bearing areas are mounted on ball bearings and can therefore also absorb lateral forces.

This results in a gimbal suspension/mounting of the test specimen 1 on the holding device 2, which gives the test specimen the degrees of freedom that are useful or necessary for a biaxial test, for example. If the load frame 4j and likewise the carrier frame 14 are designed to be square or circular, as shown in FIGS. 4 and 8, the load frame 4j within the carrier frame 14 can also be rotated about the longitudinal axis of the test specimen in each case by 90° or, in the case of an annular design, in any angular increments.

In addition, this results in the possibility of also changing the clamping blocks within the load frame 4j in 90° steps in the case of a square design and in any or even preset discrete angular steps in the case of a circular design of the load frame. This simplifies the possibilities for rotating the test specimen 1 about its longitudinal axis in order to set loading directions as desired during the test.

Figure 13:
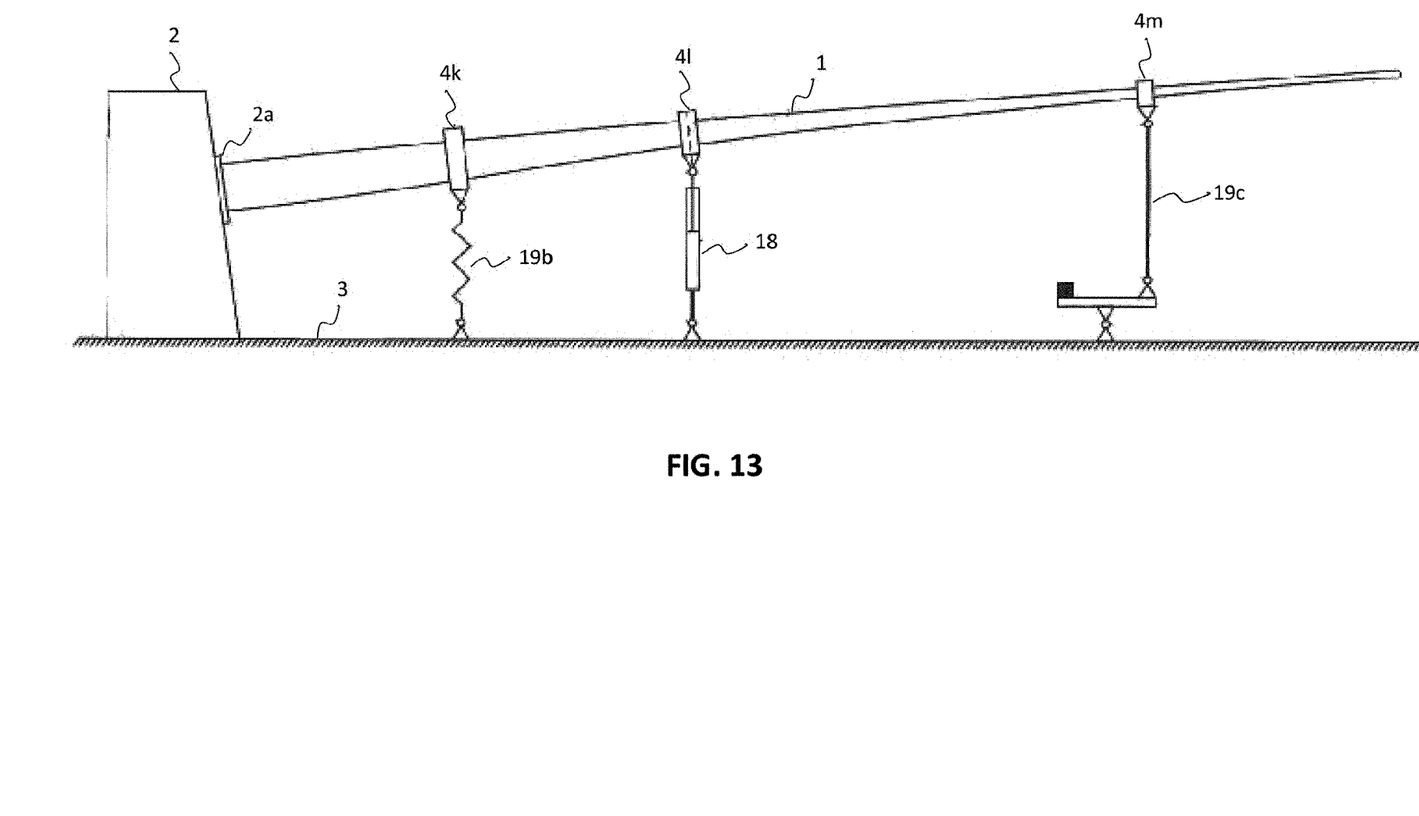
FIG. 13 shows a schematic side view of a testing device in which a test specimen is firmly clamped on one side in a holding device.

FIG. 13 shows a test specimen 1 in a testing device in which the test specimen in the form of a rotor blade is firmly clamped at one end to a holding device 2 in a clamping device 2a in such a way that it has no degrees of freedom at this end. Passive load-introducing means 19b, 19c and an active load-introducing means 18 are shown by way of example, each engaging load frames 4k, 4l, 4m. As shown in the above examples, these load frames can be designed according to the invention with a four-fold symmetry or also in the form of a circular ring. Each one of the load frames 4k, 4l, 4m may have such an embodiment.

Thus, with the various types of single-sided support/clamping of rotor blades shown, all possible combinations with rotatable load frames result.

Passive load-introducing means 19a, 19b, 19c, which can be either spring elements for connecting a load frame to a stationary point or decoupled or directly coupled masses, are used to set suitable system natural frequencies of the test specimen during the test. Individual, several or all of the passive load-introducing means can also be designed in such a way that they act on the test specimen in only one of the loading directions, so that the system natural frequencies of the test specimen can be individually adjusted in the intended loading directions. The active load-introducing means 18a, 18b can also be set separately from one another with respect to the periodicity of the load application, so that cyclic excitation in the desired loading directions can be selected in each case at the system natural frequencies or in the immediate vicinity of the system natural frequencies of the test specimen. In accordance with the invention, the test conditions are readily and easily adjustable by means of the various options for rotatability of the test specimen, and in carrying out the test it may be provided that the loading frequency in one of the desired loading directions is in each case an integral multiple of the loading frequency in the second desired loading direction.

The following aspects of the invention may each individually, or in combination with each other, or in combination with individual claims of the present application, constitute protectable inventions.

Aspects of the Invention:
1. Method for testing a rotor blade of a wind turbine, wherein a target bending moment distribution is predetermined, comprising at least the steps of:
   receiving the rotor blade in a clamping device or a bearing device,
   so that a longitudinal axis of the rotor blade extends from a clamping point or bearing point of the rotor blade,
   attaching one or more load frames to the rotor blade,
   providing at least two active load-introducing means which each engage one of the load frames, wherein a first of the at least two active load-introducing means is arranged for load introduction in a rotational direction of the rotor blade and a second of the at least two active load-introducing means is arranged for load introduction in a flapping direction of the rotor blade,
   providing at least one passive load-introducing means engaging one of the load frames, wherein for a system comprising the rotor blade and the at least one passive load-introducing means, a system natural frequency for the rotational direction and/or for the flapping direction is changed by the at least one passive load-introducing means,
   cyclic load application by means of the at least two active load-introducing means, wherein a loading frequency of the first active load-introducing means and a loading frequency of the second active load-introducing means are selected such that one of them is an integer multiple of the other.
2. The method according to aspect 1, wherein
   the load frames and the at least two active load-introducing means and the at least one passive load-introducing means are arranged at predetermined positions which are selected such that a bending moment distribution introduced during cyclic load introduction does not fall below the nominal bending moment distribution and does not exceed it by more than 20%, and in some embodiments not by more than 15%, and in some embodiments not by more than 10%.
3. The method according to aspect 1 or 2, wherein the at least one passive load-introducing means is arranged such that the system natural frequency in the impact direction coincides with the loading frequency in the impact direction or, for introducing an additional load, does not deviate more than 10%, from the system natural frequency in the impact direction.
4. The method according to any one of the preceding aspects, wherein the at least one passive load-introducing means is arranged such that the system natural frequency in the rotational direction coincides with the loading frequency in the pivot direction or, for introducing an additional load, deviates no more than 10%, from the system natural frequency in the pivot direction.
5. The method according to any one of the preceding aspects, wherein the at least two active load-introducing means are controlled or regulated for adjusting and maintaining the ratio between the loading frequency of the first active load applying means and the loading frequency of the second active load applying means.
6. The method according to any one of the preceding aspects, wherein at least one passive load-introducing means is provided for adjusting the system natural frequency in the flapping direction and at least one passive load-introducing means is provided for adjusting the system natural frequency in the rotational direction.
7. The method according to any of the preceding aspects, wherein the rotor blade is clamped such that the longitudinal axis of the rotor blade extends substantially horizontally and the rotational direction is oriented horizontally.
8. The method according to any one of the preceding claims, wherein the at least two active load-introducing means and/or the at least one passive load-introducing means are externally anchored.
9. The method according to any one of the preceding claims, wherein the at least one passive load-introducing means is selected from fixed masses, decoupled masses and elastic elements.
10. The method according to any one of the preceding aspects, wherein at least one of the at least one passive load-introducing means is selected as a decoupled mass or an elastic element.
11. The method according to any one of the preceding aspects, wherein the ratio between the loading frequency of the first load-introducing means and the loading frequency of the second load-introducing means is 1:1, 2:1, or 1:2.
12. The method according to any of the preceding aspects, wherein a distribution of moment vector paths occurring in the field is determined, for example by means of an aeroservoelastic multi-body simulation, and a target center bending moment is adjusted by the passive load-introducing means, for example by the decoupled masses and/or by a preload of the elastic elements, such that a center point of moment vector paths generated by means of the active load-introducing means lies within the distribution of moment vector paths occurring in the field.
13. The method according to aspect 12, wherein the moment vector paths generated by the active load-introducing means are adapted to a contour of the distribution of the moment vector paths occurring in the field by adjusting the rotor blade clockwise or counterclockwise about its longitudinal axis.

14. The method according to aspect 12 or 13, wherein the moment vector paths generated by the active load-introducing means are matched to a contour of the distribution of moment vector paths occurring in the field by adjusting a phase angle between the load application in the rotational direction and the load application in the strike direction.

15. The method according to any one of the preceding aspects, wherein the ratio between the loading frequencies is 1:1 and a phase angle between the load application in the rotational direction and the load application in the impact direction is between 0° and 180°, and in some embodiments between 45° and 135°, and in some embodiments 90°.

16. The method according to any one of Aspects 1 to 15, wherein the ratio between the loading frequencies is 1:2 or 2:1, and a phase angle between the load application in the rotational direction and the load application in the strike direction is 0° or 180°.

17. The method according to any one of the preceding aspects, wherein a minimum distance between adjacent load frames is 1m.

18. A testing device for testing a rotor blade according to a method according to any one of the preceding aspects, comprising
a clamping device for clamping or bearing device for rotatably supporting a rotor blade at a clamping location or bearing location of the rotor blade such that a longitudinal axis of the rotor blade extends substantially horizontally from the clamping location or bearing location, one or more load frames for attachment to the rotor blade, at least two active load-introducing means each attached to one of the load frames, at least one passive load introducing means attached to one of the load frames, wherein at least one of said at least two active load-introducing means is adapted for load introduction in a rotational direction into said rotor blade and at least one of said at least two active load introduction means is adapted for load introduction in a flapping direction into said rotor blade, and wherein said at least one passive load introduction means is externally anchored and comprises an elastic element and/or a decoupled mass and is adapted to adjust a system natural frequency in said pivot direction and/or in said flapping direction, for a system comprising said rotor blade and said at least one passive load introduction means.

19. The testing device according to aspect 18, further comprising a control device adapted to control a loading frequency of the first active load-introducing means and a loading frequency of the second active load applying means such that a ratio between these two loading frequencies is rational.

20. The testing device according to any one of Aspects 18 or 19, wherein the active load-introducing means is in the form of a hydraulic, or pneumatic, or electric actuator and is in some embodiments externally anchored.

21. The testing device according to any one of aspects 18 to 20, wherein the resilient member is in the form of a spring or torsion spring or beam or leaf spring and is in some embodiments externally anchored.

22. The testing device, according to any one of aspects 18 to 21, wherein the resilient member comprises a fiber composite, comprising for example glass fibers and/or carbon fibers.

The invention claimed is:

1. A mechanical testing device with at least one load frame with a frame part and a clamping device held therein, in which a beam-shaped test specimen can be clamped projecting through the load frame, the load frame being mounted in a first pivot bearing arrangement on a carrier frame or a support frame so as to be rotatable about a first transverse axis of the test specimen which extends perpendicularly to its longitudinal axis projecting through the clamping device, such that the load frame has a square shape with a four-fold rotational symmetry, wherein the frame part has at least two frame-part-side pivot bearing parts or fastening devices for pivot bearing parts, which are arranged offset by 90 degrees on its circumference and are each configured to interact with carrier-frame-side pivot bearing parts on the carrier frame or pivot bearing parts on the support frame.

2. The testing device according to claim 1, characterized in that the clamping device can be fastened in the frame part in a plurality of positions by means of a tensioning device, wherein the positions are each rotated relative to one another about the longitudinal axis of the clamped test specimen.

3. The testing device according to claim 1, characterized in that two clamping blocks are provided within the clamping device, which between them leave free, for the test specimen, a through-opening-, the width of which, measured perpendicularly to the longitudinal axis of a clamped-in test specimen, is at least twice as large as its height-, wherein in the case of a test specimen in the form of a rotor blade segment the width of the through-opening is measured in the rotational direction and the height in the flapping direction.

4. The testing device with a load frame according to claim 1, characterized in that the frame part is mounted in the first pivot bearing arrangement in the support frame so as to be rotatable about the first transverse axis-, and the support frame is mounted so as to be pivotable about a pivot axis which is perpendicular to the longitudinal axis of the test specimen and spaced therefrom.

5. The testing device according to claim 1, characterized in that at least one active or passive load-introducing means is provided, which has a load frame for connection to a test specimen, wherein the load frame has a frame part and a clamping device held therein, in which a beam-shaped test specimen can be clamped projecting through the load frame, and wherein the frame part has a four-fold rotational symmetry.

6. The testing device according to claim 1, characterized in that the beam-shaped test specimen is selected from the group consisting of a rotor blade and a rotor blade segment.

7. A mechanical testing device with at least one load frame with a frame part and a clamping device held therein, in which a beam-shaped test specimen can be clamped projecting through the load frame, the load frame being mounted in a first pivot bearing arrangement on a carrier frame or a support frame so as to be rotatable about a first transverse axis of the test specimen which extends perpendicularly to its longitudinal axis projecting through the clamping device, such that the load frame has a square shape with a four-fold rotational symmetry, wherein in a first pivot bearing arrangement the frame part is rotatably mounted in the carrier frame about the first transverse axis, such that the carrier frame has the same rotational symmetry as the frame part and the carrier frame is rotatably mounted in a second pivot bearing arrangement on the support frame about a second transverse axis of the test specimen clamped in the load frame, which second traverse axis extends perpendicularly to the longitudinal axis, is inclined with respect to the first transverse axis-, and extends perpendicularly to the first transverse axis of the test specimen.

8. The testing device according to claim 7, characterized in that the support frame is pivotably mounted about a pivot axis which extends perpendicular to the longitudinal axis of the test specimen and spaced apart therefrom.

* * * * *